United States Patent [19]

Berkowitz et al.

[11] Patent Number: 5,712,462
[45] Date of Patent: Jan. 27, 1998

[54] IMPLANTABLE MEDICAL DEVICE WITH HIGH RELIABILITY ELECTRICAL CONNECTION USING REACTIVE METALS

[75] Inventors: Fred J. Berkowitz, Champlin; Mark D. Bryen, Plymouth; Joseph F. Lessar, Coon Rapids; Robert E. Kraska, Minneapolis, all of Minn.

[73] Assignee: Medtronic, Inc., Minneapolis, Minn.

[21] Appl. No.: 542,575

[22] Filed: Oct. 13, 1995

[51] Int. Cl.⁶ ................................................ B23K 11/00
[52] U.S. Cl. ........................................................ 219/117.1
[58] Field of Search .................................. 219/56.22, 67, 219/78.01, 117.1, 118, 136, 137 R, 146.1, 146.23, 146.24, 146.41

[56] References Cited

U.S. PATENT DOCUMENTS

| | | |
|---|---|---|
| 4,678,868 | 7/1987 | Kraska et al. ................... 174/152 |
| 4,866,236 | 9/1989 | DeNale et al. ..................... 219/74 |
| 5,306,581 | 4/1994 | Taylor et al. ..................... 429/181 |
| 5,393,948 | 2/1995 | Biorkman, Jr. ..................... 219/74 |

OTHER PUBLICATIONS

"Resistance Welding Manual, Third Edition; Welding Handbook, Eighth Edition", vol. 2; and ASM Handbook, Tenth Edition, vol. 6, undated.

Primary Examiner—Matthew V. Nguyen
Attorney, Agent, or Firm—Thomas F. Woods; Harold R. Patton; Daniel W. Latham

[57] ABSTRACT

A method of making a high reliability electrical connection in an implantable medical device. The electrical conductors may include metals such as niobium, molybdenum, tantalum, platinum, titanium, nickel and alloys thereof. The electrical conductors are resistance welded by establishing contact between the conductor pair, providing a protective atmosphere around the contacting pair, and applying electrical energy to the contacting pair to cause fusion while maintaining the protective atmosphere.

20 Claims, 2 Drawing Sheets

IMPLANTABLE MEDICAL DEVICE WITH HIGH RELIABILITY ELECTRICAL CONNECTION USING REACTIVE METALS

BACKGROUND OF THE INVENTION

This invention generally relates to implantable medical devices and to high reliability electrical connections for such devices. In particular, the invention relates to high reliability electrical connections between metals such as niobium, molybdenum, tantalum, platinum, titanium, nickel and their alloys.

It is well known that medical devices implanted in the human body are implanted in closed, sealed cases of bicompatable metal such that no repair of the device may be made following its construction and implantation in the patient. Such devices may be required to operate without maintenance for many years and the very life of the patient may depend on its reliable functioning.

In particular, high reliability implantable devices such as defibrillator batteries, pacemaker batteries, pacemaker internal interconnects, pacemaker outputs, etc., require electrical connections which will remain viable for years of critical service. In some cases, a highly reactive metal such as Titanium, Niobium, Tantalum, Zirconium, etc. is used as a relatively small electrical conductor and must be joined with a second metal conductor in an extremely reliable and reproducible weld joint. A specific example of this is the connection between the titanium tabs of a cathode current collector and the niobium feedthrough pin on the inside of a battery cover of a medical device battery. It is especially important in such a battery application that the electrical connection should be able to withstand the corrosive environment of the battery and should not include materials which would affect the electrochemical operation of the battery.

Resistance welding of metals is well known. For background purposes several references are available which describe resistance welding in general. Such references include the following: "*Resistance Welding Manual, Third Edition;* " *Welding Handbook, Eighth Edition*, Volume 2; and "*ASM Handbook, Tenth Edition*, Volume 6. For Example, in the *Resistance Welding Manual*, page 269 discusses practices for resistance welding of refractory metals in which shielding with liquids such as water or carbon tetrachloride is suggested to avoid embrittlement of the weld. Or in the *Welding Handbook*, page 572 discusses welding of titanium alloys in air. Or in the *ASM Handbook*, page 581 discusses special considerations for welding of Niobium in air. However, none of these references address the problem of high reliability welds for very small reactive metal conductors such as those found in implantable medical devices.

Basically, resistance welding is accomplished by forcing the metals to be joined into close contact and passing an electrical current between them. The resistance of the metal (s) to the flow of the electrical current results in the localized heating of the metal(s). If sufficient heating takes place at the interface, the metals will be joined. Resistance welds in which little or no melting of the metals occurs are known as forged welds, while welds in which the metals melt and intermix are known as fusion welds. Typically the duration of current flow during a resistance weld is very short and is measured in milliseconds.

The very short weld duration time combined with the forced intimate contact between the metals to be joined ordinarily allows resistance welding to be performed without the need of any shielding from atmospheric gases. However, ambient air can react with non-precious metals during welding to form undesirable oxides or nitrides in and around the weld zone. The presence of said oxides/nitrides will typically have an undesirable effect upon both corrosion resistance and weld strength. In particular, the inventors have found that in welding medical device conductors made with very reactive metals such as titanium, tantalum, niobium, zirconium, etc., no reliable fusion welds can be made in ambient air. The expulsed metal generated during the weld does not wet the base metal but instead is beaded up to make a limited fusion weld or a forged weld. Moreover, the materials making up the small parts can undergo significant oxidation or nitridization when welded in ambient air.

Several methods are typically used in welding operations for protection from the atmosphere. Metal inert gas welding (MIG) utilizes an inert gas cover over it's consumable electrode. Tungsten inert gas (TIG) welding uses an inert gas cover over it's non-consumable electrode. Other methods engage the use of "fluxes" to both protect and continually clean off the metals surfaces.

By contrast, it has been assumed by industry that in resistance welding, because of the very short nature of the weld time and the fact that the surfaces to be welded are protected by their intimate contact that resistance welds do not require protection to form a fusion weld.

SUMMARY OF THE INVENTION

We have discovered a method of making an implantable medical device having a high reliability electrical connection within the case of the device in which the high reliability electrical connection is between a reactive metal conductor such as a niobium, molybdenum, tantalum, titanium, or nickel conductor and a second metal conductor such as a niobium, molybdenum, tantalum, platinum, titanium, or nickel conductor. The method comprises establishing contact between the pair of conductors, providing a protective atmosphere around the contacting pair of conductors, applying electrical energy to the contacting conductors by means of a resistance welding apparatus to cause fusion while maintaining the protective atmosphere and then enclosing the fused electrical connection within the case. This method is of particular importance for making batteries used in implantable medical devices since reactive metals may be selected for conductors due to their resistance to the corrosive environment of the battery and since the connection between those conductors must also be highly corrosion resistant.

It has been found that the use of an inert cover gas or environment, i.e., a protective atmosphere herein, provides for consistently higher quality fusion welding between highly reactive metals such as titanium and niobium. This is especially true where the metals to be welded are provided in thin conductor materials. The use of a cover gas reduces or eliminates oxidation of the metal in and around the weld zone, with the added advantage that one or both of the metal pair may flow and wet out well on all sides of the joint. This wetting of the solid metal surfaces is not unlike that seen in a brazed joint and has not been attainable without the use of the inert gas atmosphere. The use of an inert shielding, therefore, can enhance both ductility and cleanliness of resistance welded metals. It is also expected that the same effects will be seen if the welding were performed in vacuo. Herein, the term "protective atmosphere" is used to mean all such shielding atmospheres, protective environments and the like whether inert or in vacuo.

The use of protective atmosphere gas resistance welding has the additional benefit of allowing for very rapid visual inspection of welds requiring extreme reliability. The absence of the oxidized metal in and around the weld in conjunction with the metal flow behavior allows for the quality of the weld to be visually ascertained. Several additional advantages accrue with the invention. Higher strength welds are provided, due to the increased degree of wetting by the expulsed metal. Surface oxidation or nitridization of base metal surfaces is eliminated, thus improving wetability of the expulsed metal and dramatically improving peel strength. The absence of oxidization products on welds internal to the article being welded minimizes the possibility of contamination from particles falling off the weld zone. Ductile welds are provided, as there is little interstitial embrittlement occurring. Corrosion resistance is maintained due to the elimination of oxygen and nitrogen up-take and the formation of corrosion resistant phases.

DETAILED DESCRIPTION OF THE INVENTION

Existing resistance welds between titanium tabs and niobium pins in air do not produce consistent fusion welds. Existing resistance welding in air produces primarily a forged weld with the weld zone itself discolored due to oxidation and nitridization of the base metal.

Forged welds have insufficient peel strength and exhibit brittle fracture characteristics associated with embrittlement by oxygen and nitrogen in the atmosphere. Adding an argon or other inert cover gas to this process eliminates the embrittlement and produces a superior weld with adequate peel strength.

In accordance with this invention, the use of a resistance welding apparatus such as a high frequency inverter type apparatus, when combined with a protective atmosphere to produce an inert environment, produces a fusion weld in which the expulsed metal wets well with the base metal prior to solidification. Without the protective atmosphere, the expulsed metal does not wet the base metals but instead beads up and at best a limited fusion weld or a forged weld is produced accompanied by oxidation and nitridization of the base and weld metals. A preferred protective atmosphere is an inert one such as argon.

The use of an inert cover gas produces a filleted fusion weld which is much stronger than a forged weld produced with conventional technology. An example of a preferred DC constant current power resistance welding apparatus is available from Unitek Miyachi Corp., 4342 Tullu Road, Dubbin, Ohio 43017. Components thereof are identified in Example 1 below.

This invention is particularly applicable to the resistance welding of reactive metals selected from the group consisting of niobium, molybdenum, tantalum, platinum, titanium, nickel and alloys such as iron-nickel-cobalt. Although platinum is a precious metal, it is considered in this group because it is often welded to a reactive metal. Niobium and titanium are an example of a preferred pair for resistance welding. Of the protective atmospheres available, including in vacuo, inert atmospheres are preferred. Although an argon inert environment is most preferred, other inert environments such as helium, krypton, xenon and various mixtures thereof with each other and with argon may also be used. Although the invention is applicable for welding parts in all kinds of medical devices and for all kinds of uses, it is specifically described herein with reference to welding feedthrough pins and current collector tabs in batteries and conductors in pulse generators, pacemakers, defibrillators, neurostimulators and the like as these are presently the preferred applications of the invention.

Figure 1:
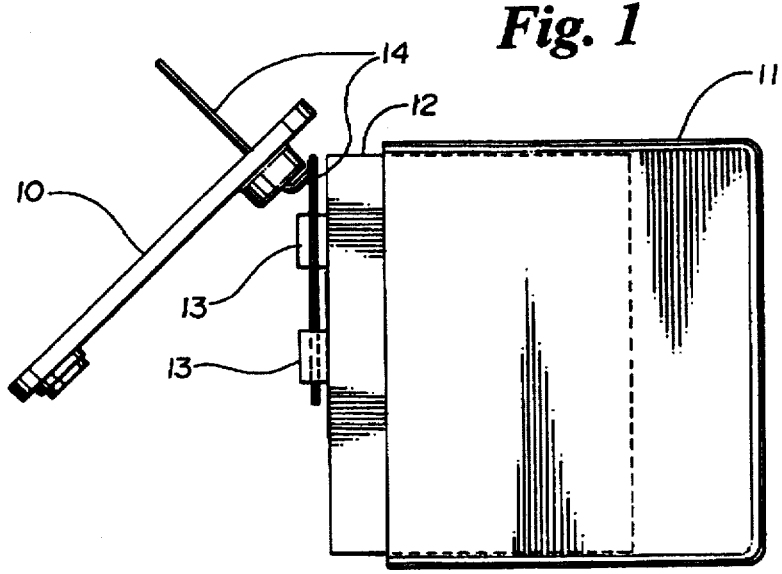
FIG. 1 is a drawing of a battery showing the connection of a pin feedthrough to a pair of collector tabs.

Such a battery is shown in FIG. 1, demonstrating a cover 10 to be welded to a battery case 11 which contains a battery electrode assembly 12 having a pair of current collector tabs 13 contacted by a pin feedthrough 14. After pin 14 is welded to tabs 13, assembly is completed by inserting electrode assembly 12 fully into case 11 and welding cover 10 to case 11 to close and seal the case 11.

EXAMPLE 1

Battery current collector tabs of titanium and niobium feedthrough pins were welded per this invention with the following equipment and schedule.

EQUIPMENT

Cathode tab/feedthrough pin weld fixture 092274-D and 220175-A, modified
Miyachi model IP-215A inverter power supply
Miyachi model IT-500A inverter transformer
Miyachi model MM-336A weld checker
Miyachi model MH-15C weld head
Electrode force gauge, both Hughes model HRA-20 and
Miyachi model MM-601A with MA-520 load cell
Argon cover gas fixture, per drawing 060598-2
Chatillon Model LTCM-4 force gauge

SCHEDULE

| | |
|---|---|
| Rise Time | 10 msecs (no tolerance) |
| Weld Time | 40 msecs (no tolerance) |
| Weld Current | 1.00 kamps (no tolerance) |
| Gain | 0 gain (no tolerance) |
| Force | 3.50 ± 0.23 kg (7.7 ± 0.5 lbs) |
| Upper electrode material | Copper per 092274-D |
| Lower electrode material | Copper per 092274-D |
| Upper electrode polarity | positive |
| Lower electrode polarity | negative |
| Argon flow rate | 30 CFH minimum |

PROCEDURE

Welds were completed by production personnel on samples with the equipment and weld schedule described above. Both pull and peel tests with a Chatillon tester were then completed by production personnel and the strength recorded. All welds were then visually inspected to verify that the weld itself did not break and that either the pin broke or a weld nugget remained on the pin after testing. Welds were completed with the pin positioned on top of the tab, corresponding to the weld joint orientations in the inner portion of a battery cover.

Figure 2:
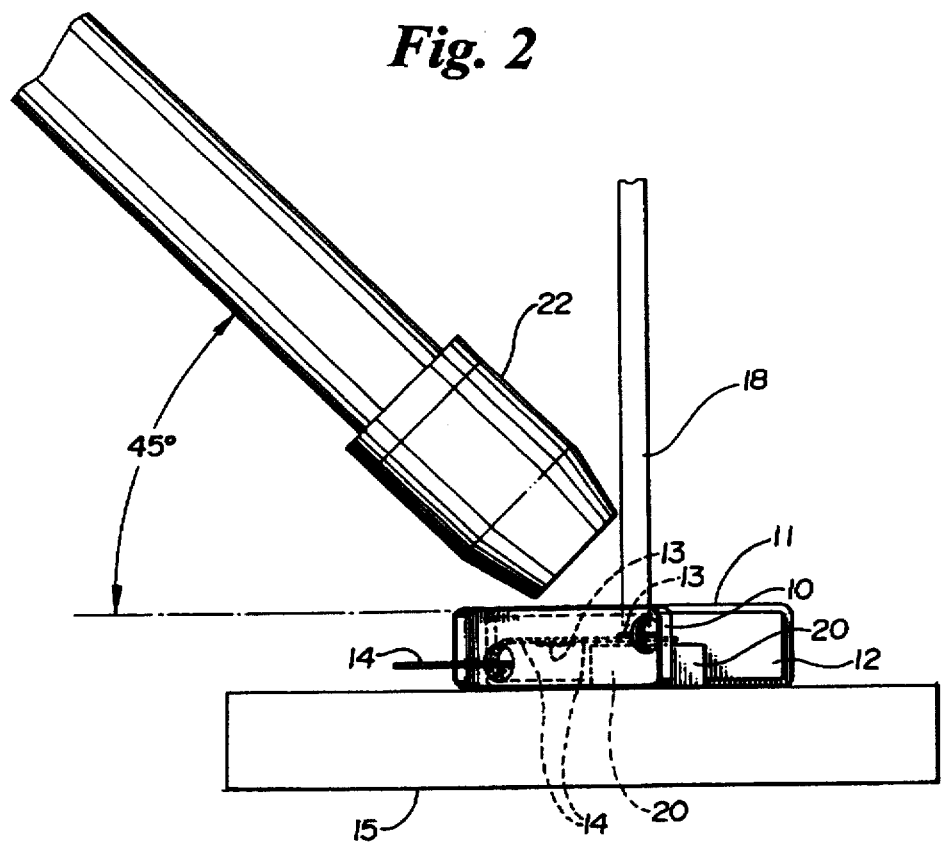
FIG. 2 is a schematic drawing of a resistance welding arrangement according to the invention.
Figure 3:
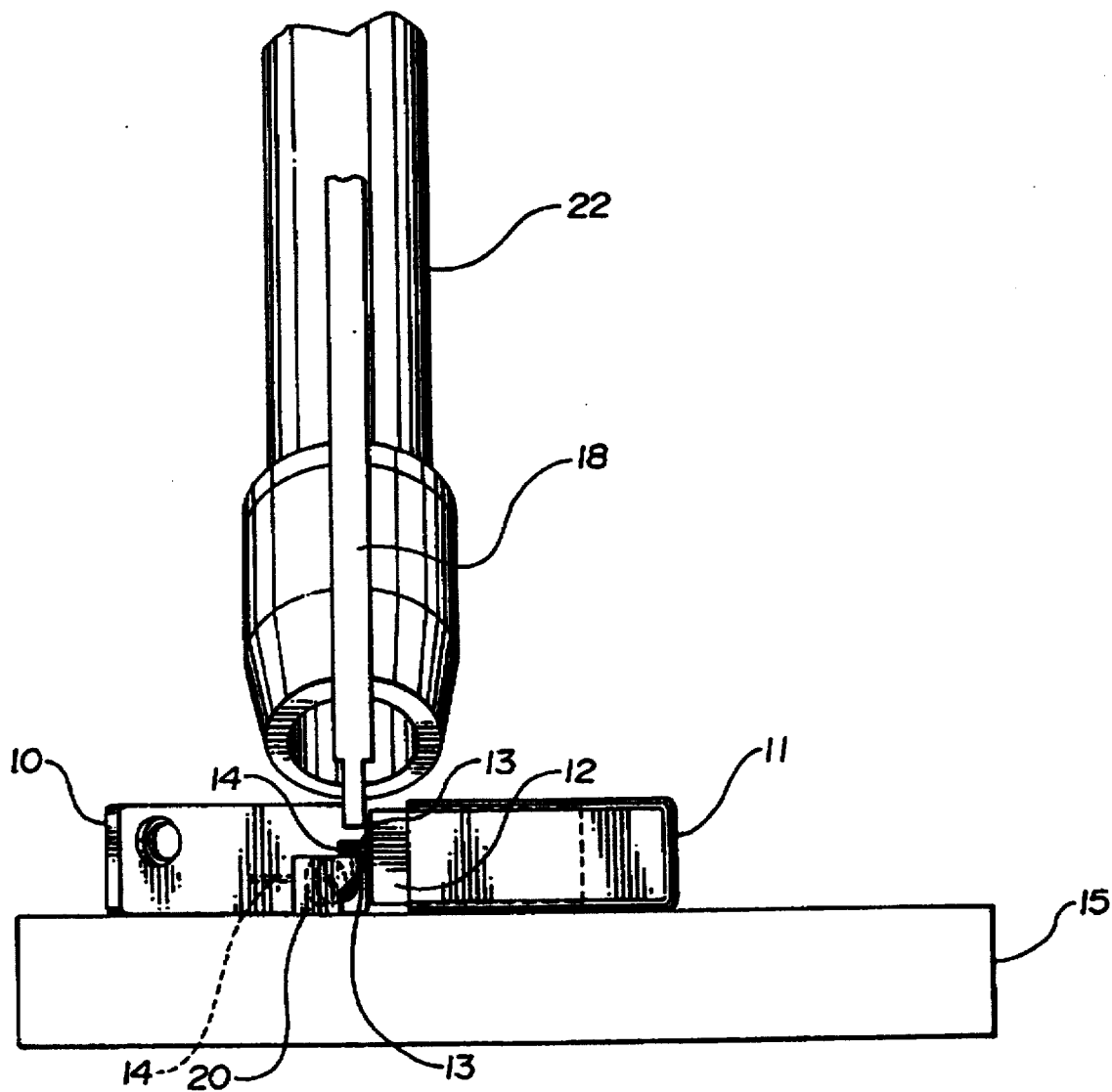
FIG. 3 is a side view of FIG. 1.

The above described procedure is illustrated in FIGS. 2 and 3. As shown in these Figures, a battery electrode assembly 12, a battery case 11 and a cover 10 are positioned on a work table 15. The cover carries a glassed-in niobium feedthrough pin 14 as is known in the art. The pin is associated with tabs 13 (best seen in FIG. 3). Two welding electrodes 18 and 20 are positioned for resistance welding the tab and pin, an upper electrode and a lower electrode, respectively. A gas jet 22 is positioned as shown in the Figures i.e., it is centered on the upper electrode 18 (FIG. 2) at a 45° angle with respect thereto and with the bottom of the gas jet just clearing the top of battery cover and almost touching the upper electrode. Argon gas is supplied through the jet to flood the weld region during the welding procedure.

EXAMPLE 2

The same schedule used in Example 1 was used to join the following:
 0.018 inch Ti tab to a 0.035 inch Nb pin
 0.018 inch Ti tab to a 0.020 inch Mo pin
 0.018 inch Ti tab to a 0.020 inch Ta pin
 0.004 inch Ni tab to a 0.020 inch Mo pin All examples provided satisfactory welds which met all specification requirements including pull test and peel test requirements.

The above Examples and disclosure are intended to be illustrative and not exhaustive. These examples and description will suggest many variations and alternatives to one of ordinary skill in this art. One such alternative is attachment to an implantable pulse generator (IPG) feedthrough pin (interior or exterior). Alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. A method of making an implantable medical device having a case adapted for implantation in a human or animal body and within the case an electrical connection between a pair of metal conductors, the first conductor comprised of a metal selected from the group consisting of niobium, molybdenum, tantalum, platinum, titanium, nickel and alloys thereof and the second conductor comprised of a metal selected from the group consisting of niobium, molybdenum, tantalum, titanium, nickel and alloys thereof, the method comprising:

establishing contact between the metal comprising the first conductor and the metal comprising the second conductor;

providing a protective atmosphere around the contacting pair of conductors, applying electrical energy to the contacting pair by means of a resistance welding apparatus to cause fusion of the metals comprising the conductors while maintaining the protective atmosphere; and enclosing the resulting fused electrical connection within the case.

2. The method of claim 1 in which the protective atmosphere is an inert environment.

3. The method of claim 2 wherein the inert environment is comprised of argon.

4. The method of claim 2 wherein the inert environment is comprised of helium.

5. The method of claim 2 wherein the inert environment is comprised of a mixture of argon and helium.

6. The method of claim 1 in which the contacting pair is comprised of a first conductor of titanium and a second conductor of niobium.

7. The method of claim 6 in which the inert environment is comprised of argon.

8. The method of claim 6 wherein the inert environment is comprised of helium.

9. The method of claim 6 wherein the inert environment is comprised of a mixture of argon and helium.

10. The method of claim 1 in which the welding apparatus is a high frequency inverter welding apparatus.

11. The method of claim 1 in which the conductors have a thickness of about 0.035 inch or less.

12. A method of making a battery adapted for use in a medical device having a case and within the case an electrical connection between a pair of metal conductors, the first conductor comprised of a metal selected from the group consisting of niobium, molybdenum, tantalum, platinum, titanium, nickel and alloys thereof and the second conductor comprised of a metal selected from the group consisting of niobium, molybdenum, tantalum, titanium, nickel and alloys thereof, the method comprising:

establishing contact between the metal comprising the first conductor and the metal comprising the second conductor;

providing a protective atmosphere around the contacting pair of conductors, applying electrical energy to the contacting pair by means of a resistance welding apparatus to cause fusion of the metals comprising the conductors while maintaining the protective atmosphere; and enclosing the resulting fused electrical connection within the case.

13. The method of claim 12 in which the inert environment is comprised of argon.

14. The method of claim 12 in which the inert environment is comprised of helium.

15. The method of claim 13 in which the inert environment is comprised of a mixture of argon and helium.

16. The method of claim 12 in which the contacting pair is comprised of a first conductor of titanium and a second conductor of niobium.

17. The method of claim 16 in which the inert environment is comprised of argon.

18. The method of claim 12 in which the resistance welding apparatus is a high frequency inverter welding apparatus.

19. The method of claim 12 in which the conductors have a thickness of about 0.035 inch or less.

20. A method of forming an improved resistance weld between contacting pairs of reactive metal conductors selected respectively from the group consisting of niobium, molybdenum, tantalum, platinum, titanium, nickel and alloys thereof, comprising:

establishing contact between a pair of conductors;

providing a protective atmosphere around the contacting pair, and applying electrical energy to the contacting pair by means of a resistance welding apparatus to cause fusion while maintaining the protective atmosphere.

* * * * *